Dec. 25, 1962 R. O. GOSE 3,070,014
JET PROPULSION DEVICE
Filed May 27, 1959 2 Sheets-Sheet 1
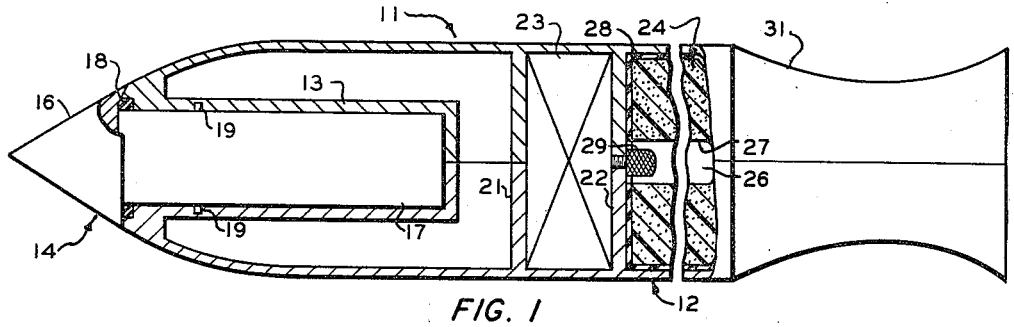
FIG. 1
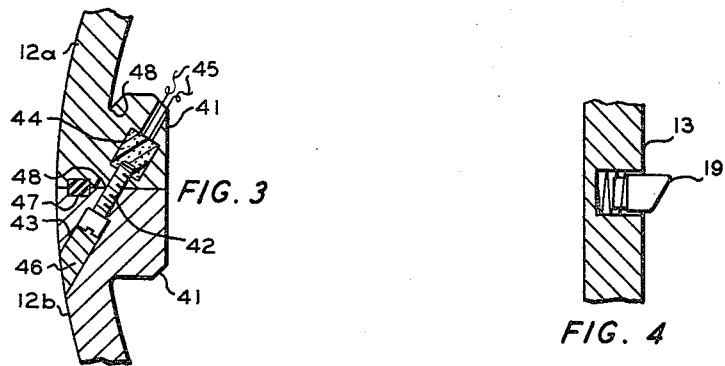
FIG. 3
FIG. 4
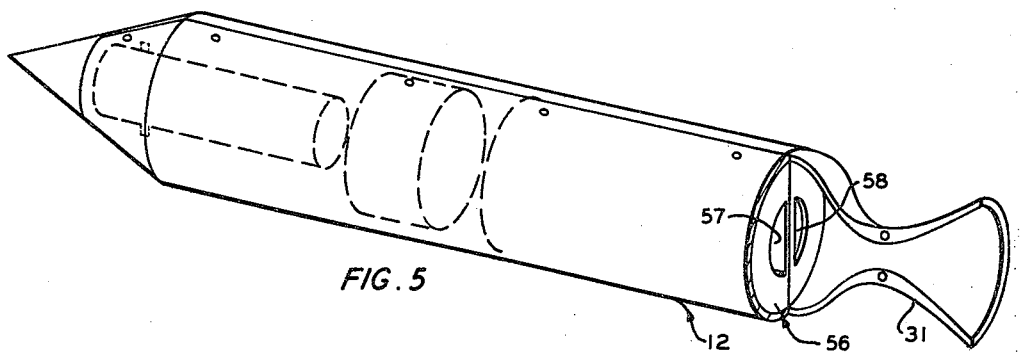
FIG. 5
INVENTOR.
R.O. GOSE
BY Hudson & Young
ATTORNEYS

INVENTOR.
R. O. GOSE

BY Hudson & Young

ATTORNEYS

United States Patent Office 3,070,014
Patented Dec. 25, 1962

3,070,014
JET PROPULSION DEVICE
Robert O. Gose, Los Angeles, Calif., assignor to Phillips Petroleum Company, a corporation of Delaware
Filed May 27, 1959, Ser. No. 816,338
5 Claims. (Cl. 102—49)

This invention relates to a jet propulsion device. In another aspect, it relates to a jet propulsion device having a detachable or severable solid propellant rocket motor.

In recent years, considerable work has been directed toward the development of solid propellant rocket motors, missiles, projectiles, and the like. Such propulsion devices generally comprise a cylindrical casing defining a combustion chamber loaded or charged with solid propellant material having certain exposed burning surfaces upon which ignition is initiated. The subsequent burning of the propellant generates large volumes of gases at high pressures and temperatures. These gaseous products are discharged from the combustion chamber at high velocity through an exhaust nozzle located at the rear or aft end of the chamber, thus developing propulsive thrust which propels the device forward. The solid propellant material from which such charges are fabricated often comprises a solid fuel and a solid oxidizer for oxidizing the fuel. Ammonium nitrate and ammonium perchlorate are suitable oxidizers, whereas the fuel component can generally be a hydrocarbon material which serves as a binder for bonding the solid oxidizer particles into a solid grain, as well as acting as a fuel. Materials suitable for such use as a binder include asphalt, rubber, and other tacky hydrocarbon-containing materials.

Once the burning of the solid propellant has been initiated it cannot be stopped, that is, the burning or consumption of the propellant continues until the propellant is entirely consumed or burned up. This phenomenon often limits the field of service of solid propellant rocket motors. For example, where it is necessary to terminate powered or sustained flight of a projectile, such as a ballistic-missile warhead, upon demand when the velocity of the projectile and path coincide with the desired trajectory, it is common to rely on liquid propellant systems, rather than solid propellant systems, since the propulsive reaction or combustion process of a liquid propellant system can be controlled and terminated by means of valves in the feed supply lines. Thus the control and termination problem of solid propellant burning or thrust has limited the utility or applicability of solid propellant rocket motors in jet propulsion devices.

Accordingly, an object of this invention is to provide an improved jet propulsion device. Another object is to provide a jet propulsion device having a solid propellant rocket motor system which is detachable or severable from the warhead or payload carried by the device. Another object is to circumvent or overcome the problem associated with the control and termination of powered or sustained flight of a jet propulsion device having a solid propellant propulsive system. Other objects and advantages of this invention will become apparent to those skilled in the art from the following discussion, appended claims, and accompany drawing in which:

FIGURE 1 is a side elevational view in partial section of one embodiment of the jet propulsion device of this invention;

FIGURE 3 is a view of a portion of FIGURE 1, in partial section, illustrating one means for detachably securing the severable portions of the jet propulsion device of FIGURE 1;

FIGURE 4 is a view of a portion of FIGURE 1, in partial section, illustrating one means for detachably holding the warhead or payload in the jet propulsion device of FIGURE 1; and FIGURE 5 is a view similar to FIGURE 2 illustrating another embodiment of the jet propulsion device of this invention.

Figure 2:
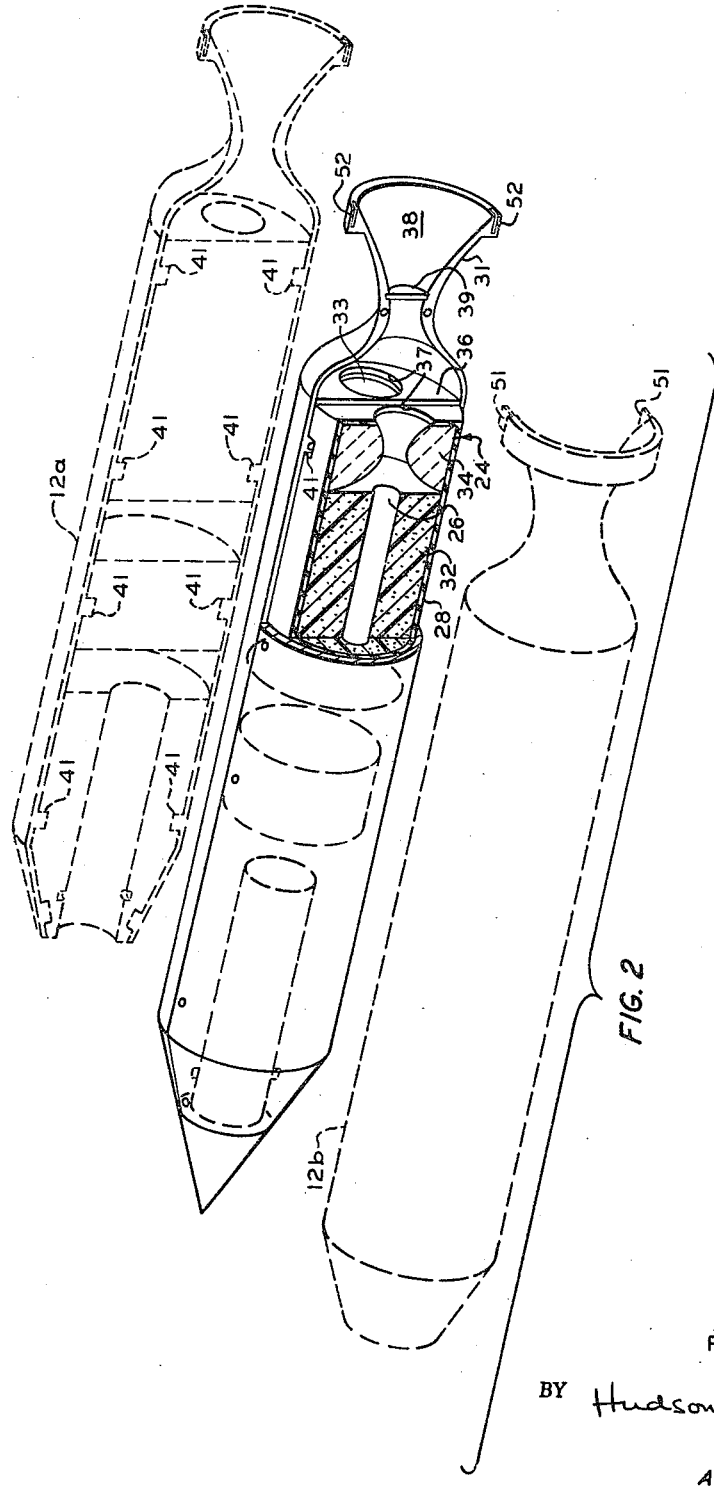
FIGURE 2 is an isometric view in partial section of the jet propulsion device of FIGURE 1, illustrating the severable feature of this invention.

Referring now to the drawing, in which like parts have been designated with like reference numbers, and initially to FIGURE 1, a jet propulsion device is generally indicated 11; this device can be the final stage of a multistage ballistic missile or the like. Jet propulsion device 11 is provided with a longitudinally severable, cylindrical casing generally designated 12, the forward end of which is reduced or streamlined and interiorly provided with a cylindrical housing 13 in which a payload or warhead generally designated 14 is removably inserted or detachably held. The payload can be explosives, a scientific instrument such as an earth satellite, or cargo of any type. The warhead 14 comprises a tapered or ogival nose 16, which functions as the nose and windbreak for the jet propulsion device 11, and a payload compartment 17 which is removably inserted and enclosed within housing 13. An annular sealing ring 18, made of rubber or the like material, provides an air-tight seal between the warhead 14 and the head end of the casing 12. The inner wall of housing 13 is provided with a plurality of releasable holding means, such as spring-biased retaining pins 19, having rearward tapered faces, which are adapted to project into complementary holes or openings in the outer wall of the payload compartment 17 of the warhead 14 and normally retain the warhead 14 in position within the jet propulsion device.

The casing 12 can be provided with two transverse walls 21, 22 defining a compartment for a control or guidance system 23. Said guidance system can be any suitable type well known in the art, such as the Command System, the Active Guidance System, or the Semi-Active Guidance System, for controlling the heading or altitude and velocity as well as the ignition means of the propellant system.

The aft end portion of casing 12 defines a compartment which is loaded or charged with a solid propellant charge 24. The propellant charge can be provided with an axial perforation 26 which is defined by an exposed burning surface 27. The outer cylindrical surface of the charge 24, as well as its ends can be restricted with slow-burning or non-combustible material 28, such as rubber, which is in turn case-bonded to the adjacent casing walls. Axially disposed in one end of the perforation 26, adjacent the exposed burning surface 27, is a conventional igniter 29, which can comprise a suitable plastic or frangible cup or container loaded with suitable pyrotechnic material, such as black powder, the ignition of which may be accomplished by means of squibs, matches, or the like, in contact with the pyrotechnic material and operatively connected to a suitable power source, such as a battery. The aft end of casing 12 is reduced and forms a nozzle 31 which communicates with the combustion chamber in which the propellant charge 24 is loaded and which is adapted to release the combustion gases from the combustion chamber at a high velocity, so as to impart thrust to the jet propulsion device.

Referring now to FIGURE 2, it is seen that the propellant charge 24 comprises two similar grains 32, 33 of solid propellant, the aft ends of which are in contact with suitable refractory material 34, which in turn abuts a charge retaining wall 36 which is provided with a pair of openings 37 that are in axial communication with the axial perforation 2 of each grain 32, 33.

The casing 12 comprises two longitudinally severable, similar casing halves or sections 12a, 12b. The longitudinal abutting surfaces or edges of each of the casing halves 12a, 12b are provided with any suitable releasable fastening means. For example, each of the abutting edges can be provided with abutting or complementary bosses 41 which are held together by any suitable means, such as conventional explosive bolts, as illustrated in FIGURE 3 in detail. In this latter figure, an explosive bolt 42 is shown inserted within a passage 43 in the abutting bosses 41, the inner end of the explosive bolt being preferably in contact with a suitable explosive 44 that is in contact with electrical igniting wires 45 which can be operatively connected to a power source, such as a battery. After the insertion of the explosive bolt 42, the outer end of the passage 43 can be filled with any suitable material 46, such as solder or the like. The abutting bosses 41 can also have disposed therebetween a suitable sealing member 47 and one of the bosses can be weakened such as at 48 so as to form a frangible portion.

Alternatively, the mating edges of the casing halves can be provided with complementary hinge means having a common channel in which is inserted Primacord, or the like, which can be ignited and exploded to cause the casing halves to separate.

It is seen in FIGURE 2 that the nozzle 31 is also formed in two sections or halves, the assembled nozzle sections defining an axial nozzle passage 38 having a converging-diverging configuration. If desired, a suitable blowout or starter disc 39, made of metal, plastic, or the like, is positioned across the nozzle passage 38 and is adapted to be ruptured or otherwise released when a predetermined pressure is built up within the combustion chamber of the solid propellant propulsive system.

The aft end of the nozzle 31 also can be provided with suitable releasable fastening means. For example, one of the nozzle sections can be provided with flanges or tongues 51 which are adapted to be inserted within channels or recesses 52 in the other nozzle section, the flanges being held in place by suitable pins, explosive bolts, or the like.

All of the releasable fastening means, such as the explosive bolts, can be operatively connected to a suitable power source controlled by the guidance system, so that all of the fastening means are released at the same time to cause the casing sections to part or sever without altering the desired trajectory of the warhead. Systems for detonating explosive bolts at a predetermined time or upon reception of a predetermined signal are disclosed in U.S. Patent No. 2,654,320, issued October 6, 1953, to R. J. Schmid and U.S. Patent No. 2,686,473, issued August 17, 1954, to W. F. Vogel.

The particular propellant charge illustrated in FIGURE 1 is that of the internal burning type. However, it should be understood that this invention is not to be unduly limited to any particular charge configuration. For example, the charges can be of the external burning type, the end burning type, or the internal-external burning type, these different propellant configurations being well known in the art. An example of a different type of charge configuration is shown in FIGURE 5. The charge 56 illustrated in FIGURE 5 has an axial perforation 57 which is transversely divided by a longitudinally extending wall 58.

In operation, jet propulsion device 11 is initially launched by any suitable means, such as the first and second stages of a multistage propulsion system. The propellant charge 24 is ignited on exposed surfaces 27 upon the closing of a suitable switch (operated by the guidance system 23) which causes the igniter 29 to function, the hot ignition products from the igniter being released and propagating down through the axial perforation 26, causing the ignition and burning of the propellant material. In burning, large volumes of gases are generated and these gases escape from the device via the nozzle passage 38 of the nozzle 31. As a result, thrust is imparted to the device and its flight through space is sustained. When it is desired to terminate the sustained flight of the device, for example, when the velocity of the device and its path coincide with the desired trajectory, the guidance system 23 operatively causes the firing of the explosive bolts or other releasable fastening means which secure the casing sections and nozzle sections together. As a result, the casing sections and nozzle sections separate from one another, as indicated by the broken lines in FIGURE 2. The warhead 14, as a result, is separated from the propulsive unit and it continues in non-sustained flight along the desired trajectory or path by means of the momentum imparted to it during the normal operation of the solid propellant system.

The solid propellant material which can be employed in fabricating the charges used in this invention include any of those known in the art, which propellant materials are self-combustible, slow-burning, non-explosive, and generate large volumes of gases. Representative solid propellants useful in this invention include those of the double base type, such as ballistite which is a solid nitroglycerin-nitrocellulose double base propellant. Another example of a double base propellant is cordite, which consists of nitroglycerin, nitrocellulose and carbamite (diethyl diphenyl urea). Other useful propellants include those of the composite type comprising a major amount of a solid inorganic oxidizing salt and a minor amount of an organic binder which serves as the fuel for the oxidizer. Such inorganic oxidizing salts include the ammonium, alkali metal, and alkaline earth metal salts of nitric, chloric, and perchloric acids, such as ammonium perchlorate, potassium perchlorate, ammonium nitrate, lithium perchlorate, potassium nitrate, and the like. Suitable binder materials which can be used in fabricating these composite propellants include natural and synthetic rubbers, asphalt, cellulose and derivatives thereof, and polymers of acrylic, epoxy, phenolic, and like materials, polyamides, polyesters, polyethylene polysulfides, polyurethanes, and the like. An example of a known composite solid propellant is Galcit, which consists of finely divided potassium perchlorate in asphalt and oil. These propellants can be cast, compression molded, or extruded into the desired shape or geometry. After shaping the propellant, it can then be cured so as to set up into a relatively rigid mass which can be machined or otherwise finished to the desired shape.

Various modifications and alterations of this invention will become apparent to those skilled in the art without departing from the scope and spirit of this invention, and it is to be understood that the foregoing discussion and accompanying drawing merely illustrate preferred embodiments of this invention which should not be construed as to unduly limiting the inventoin.

I claim:

1. A jet propulsion device, comprising a cylindrical casing comprising two complementary, severable casing halves, propulsive means comprising a solid propellant charge loaded in said casing, an exhaust nozzle affixed to the aft end of said casing, a payload detachably held within the head end of said casing and forming the nose of said device, and releasable fastening means holding said casing halves together and adapted to cause said casing halves to sever during self-sustained flight of said device and thereby release said payload from said device and separate said payload from said propulsive means to permit the non-sustained flight of said released payload.

2. A jet propulsion device, comprising a cylindrical casing having two complementary, longitudinally severable casing halves, said casing defining a combustion chamber adjacent the aft end thereof, propulsive means comprising a solid propellant charge loaded in said combustion chamber, means to ignite said charge, a guidance system in said casing, an exhaust nozzle connected to the aft end of said casing, said nozzle comprising two complementary, longitudinally severable nozzle halves, a payload detachably held within the head end of said casing and forming the nose of said device, and releasable fastening means actuated by said guidance system and holding said casing halves and nozzle halves together, said fastening means having explosive means which when exploded cause said casing halves and nozzle halves to sever during self-sustained flight of said device and thereby release said payload from said device and separate said payload from said propulsive means to permit the nonsustained flight of said released payload.

3. The jet propulsion device of claim 2 wherein said releasable fastening means comprises a plurality of complementary bosses on the longitudinal complementary edges of said casing halves and a plurality of explosive bolts holding said bosses together.

4. The jet propulsion device of claim 2 wherein said casing is interiorly provided with a cylindrical housing within its head end and adapted to house the aft end of said payload therein, and releasable holding means in said housing adapted to releasably hold said payload therein.

5. The jet propulsion device of claim 2 wherein said propellant charge comprises two longitudinally extending grains of solid propellant each having axial perforations defining an exposed burning surface.

References Cited in the file of this patent
UNITED STATES PATENTS

| | | |
|---|---|---|
| 2,466,752 | Uhl et al. | Apr. 12, 1949 |
| 2,574,479 | Hickman | Nov. 13, 1951 |
| 2,654,320 | Schmid | Oct. 6, 1953 |
| 2,686,473 | Vogel | Aug. 17, 1954 |
| 2,779,282 | Raffel | Jan. 29, 1957 |
| 2,802,396 | Montgomery | Aug. 13, 1957 |
| 2,809,584 | Smith | Oct. 15, 1957 |
| 2,945,704 | Korn | July 19, 1960 |